US012747081B2

(12) United States Patent
Huffer

(10) Patent No.: US 12,747,081 B2
(45) Date of Patent: Sep. 29, 2026

(54) RESEALABLE LIDDING FOR RIGID THERMOFORMED TUBS

(71) Applicant: TOPPAN Packaging Americas Holdings, Inc., Charlotte, NC (US)

(72) Inventor: Scott William Huffer, Hartsville, SC (US)

(73) Assignee: TOPPAN Packaging Americas Holdings, Inc., Charlotte, NC (US)

( * ) Notice: Subject to any disclaimer, the term of this patent is extended or adjusted under 35 U.S.C. 154(b) by 0 days.

(21) Appl. No.: 18/817,315

(22) Filed: Aug. 28, 2024

(65) Prior Publication Data

US 2024/0417151 A1 Dec. 19, 2024

Related U.S. Application Data

(62) Division of application No. 17/508,075, filed on Oct. 22, 2021, now Pat. No. 12,098,011.

(51) Int. Cl.
*B65D 77/20* (2006.01)
*B32B 7/14* (2006.01)
(Continued)

(52) U.S. Cl.
CPC ............ *B65D 77/2096* (2013.01); *B32B 7/14* (2013.01); *B32B 27/08* (2013.01); *B32B 27/36* (2013.01);
(Continued)

(58) Field of Classification Search
CPC ................................ B65B 7/2885; B65B 7/01
(Continued)

(56) References Cited

U.S. PATENT DOCUMENTS 3,561,668 A * 2/1971 Bergstrom ................ B65B 7/01 229/125.05
3,618,293 A * 11/1971 Loewenthal .......... B65B 7/2878 53/559
(Continued)

FOREIGN PATENT DOCUMENTS

EP 0905048 A1 3/1999
KR 100902264 B1 6/2009
(Continued)

OTHER PUBLICATIONS

International Search Report and Written Opinion for Application No. PCT/US2022/043029; Dated Dec. 23, 2022; 12 pages.
(Continued)

*Primary Examiner* — Praachi M Pathak
(74) *Attorney, Agent, or Firm* — Nelson Mullins Riley & Scarborough LLP

(57) ABSTRACT

A resealable package and method for making is provided. The package may comprise a laminate lidding member having an outer structure, an inner structure joined to the outer structure by an adhesive layer, and a pull tab. The laminate includes an outer line of weakness in the outer structure defining a separable opening portion and an inner line of weakness in the inner structure, defining a separable opening portion from the inner portion. The lidding member also comprises a second inner line of weakness formed in the inner structure, disposed between the pull tab and the inner opening portion, partially within the flange seal.

15 Claims, 11 Drawing Sheets

(51) Int. Cl.

| | |
|---|---|
| ***B32B 27/08*** | (2006.01) |
| ***B32B 27/36*** | (2006.01) |
| ***B65B 7/01*** | (2006.01) |
| ***B65B 7/28*** | (2006.01) |
| ***B65D 33/20*** | (2006.01) |

(52) U.S. Cl.
CPC .............. *B65B 7/01* (2013.01); *B65B 7/2885* (2013.01); *B65D 33/20* (2013.01); *B32B 2255/10* (2013.01); *B32B 2435/02* (2013.01)

(58) Field of Classification Search
USPC ..................................................... 53/419, 478
See application file for complete search history.

(56) References Cited

U.S. PATENT DOCUMENTS

| | | | | |
|---|---|---|---|---|
| 3,851,441 | A * | 12/1974 | Marchand | B65B 9/042 53/239 |
| 6,616,334 | B2 | 9/2003 | Faaborg et al. | |
| 8,354,132 | B2 | 1/2013 | Stephens et al. | |
| 8,979,370 | B2 | 3/2015 | Moehlenbrock et al. | |
| 9,346,598 | B2 | 5/2016 | Docherty | |
| 2015/0183564 | A1 | 7/2015 | Henderson | |
| 2015/0203223 | A1 * | 7/2015 | Ehrmann | B65B 7/164 493/52 |
| 2016/0122109 | A1 * | 5/2016 | Clark | B65D 75/5888 220/23.4 |
| 2019/0329954 | A1 | 10/2019 | Blyth et al. | |
| 2020/0290774 | A1 | 9/2020 | Duan et al. | |
| 2023/0091744 | A1 * | 3/2023 | Hogan | B05D 3/12 53/485 |
| 2023/0129400 | A1 * | 4/2023 | Huffer | B32B 27/36 220/270 |

FOREIGN PATENT DOCUMENTS

| | | | |
|---|---|---|---|
| WO | 2008086389 | A2 | 7/2008 |
| WO | 2019193473 | A1 | 10/2009 |
| WO | 2018035039 | A1 | 2/2018 |

OTHER PUBLICATIONS

ReSeal-it Website; https://resealit.com/; copyright 2019; downloaded Oct. 21, 2021, 3 pages.

Mohan, Anne Marie; Unique reclosable flexible-film thermoform for sliced meats; dated Dec. 16, 2018; 3 pages Downloaded on Oct. 21, 2021 from https://www.packworld.com/design/materials-containers/article/13376653/unique-reclosable-flexiblefilm-thermoform-for-sliced-meats.

* cited by examiner

RESEALABLE LIDDING FOR RIGID THERMOFORMED TUBS

CROSS-REFERENCE TO RELATED APPLICATIONS

This application is a divisional of U.S. Non Provisional application Ser. No. 17/508,075, filed on Oct. 22, 2021, which has been incorporated by reference herein in its entirety.

FIELD OF THE INVENTION

The present disclosure relates in general to packaging for products, and more particularly to a resealable laminate which may be formed into a lidding and affixed to a base member. In an embodiment, the disclosure is related to a laminate having (a) score lines that define peelable portions which create openings within the laminate, and when the laminate is affixed to a base, an opening into the base, (b) pull tabs, and/or (c) package integrity features. The invention also comprises methods for manufacturing the laminate and the packaging structure.

BACKGROUND

A variety of food and non-food products are packaged using flexible packaging materials formed primarily of laminations of one or more of polymer films, metallized polymer films, paper, metal foil, and the like. In many instances, packages contain products that may be used or consumed a little at a time, and the products may be susceptible to being adversely affected (e.g., becoming soggy, drying out, etc.) by exposure to the surrounding environment. Accordingly, there is a desire to be able to reclose a package after its initial opening to keep product that remains in the package fresh.

In existing resealable lidding applied to base members (i.e. a lettuce or spinach container), the tab portion is typically in the corner. When the tab is pulled away from the base member to open the package, the laminate structure wrinkles and crinkles, making it difficult to open the package. In some cases, the resealable adhesive on the flap seals one portion of the flap to another portion of the flap, an unintended consequence which makes it difficult to reclose the package with an intact adhesive seal. Likewise, the flap may not retain its original shape through this opening process. When these issues occur, the packaging structure does not necessarily reseal completely (i.e., leaves channels through the seal, connecting the interior of the container to the exterior environment), resulting in spoilage, deterioration, and/or loss of shelf life for the food product contained therein.

Through ingenuity and hard work, the present inventor has developed a laminate structure and process which changes the location of the tab and improves the opening structure. The present disclosure addresses the above needs and achieves other advantages by providing a flexible packaging structure and method for making the same in which the structure has opening/reclose features which allow the laminate to reseal to the base after removal more efficiently than current methods.

SUMMARY

In an embodiment, the invention comprises a flexible laminate comprising an outer structure; an inner structure; a pressure sensitive adhesive layer adhesively joining the outer structure and the inner structure to form a laminate, wherein the laminate has an opening end and a base end and a longitudinal direction which runs between the opening end and the base end. The laminate has at least one outer line of weakness formed in the outer structure, the at least one outer line of weakness defining part of an outer opening portion that is separable from the outer structure along the at least one outer line of weakness, wherein the at least one outer line of weakness terminates in at least one tear receiving element adjacent the opening end of the laminate. The laminate has a first inner line of weakness formed in the inner structure, the first inner line of weakness defining an inner opening portion that is separable from the inner structure along the first inner line of weakness, wherein the inner opening portion is joined to the outer opening portion such that lifting the outer opening portion out of the plane of the flexible packaging structure causes the inner opening portion to be lifted along with the outer opening portion so as to create an opening through the flexible packaging structure and a marginal region of the outer opening portion is defined between the inner and outer lines of weakness, the marginal region overlying an underlying surface of the inner structure. The laminate also comprises a tab defined by at least one line of weakness formed through both the outer structure and the inner structure, wherein the at least one outer line of weakness terminates in at least one tear propagating element and a second inner line of weakness formed in the inner structure, wherein the second inner line of weakness is disposed between the at least one tear propagating element of the tab and the at least one tear receiving element of the at least one outer line of weakness.

In an embodiment, the invention comprises a method of making a flexible package comprising providing an outer structure; providing an inner structure; adhesively joining the outer structure and the inner structure using a pressure sensitive adhesive to form a laminate, wherein the laminate has an opening end and a base end and a longitudinal direction which runs between the opening end and the base end; scoring at least one outer line of weakness in the outer structure, the at least one outer line of weakness defining part of an outer opening portion that is separable from the outer structure along the at least one outer line of weakness, wherein the at least one outer line of weakness terminates in at least one tear receiving element adjacent the opening end of the laminate; scoring a first inner line of weakness formed in the inner structure, the first inner line of weakness defining an inner opening portion that is separable from the inner structure along the first inner line of weakness. In an embodiment, the inner opening portion is joined to the outer opening portion such that lifting the outer opening portion out of the plane of the flexible packaging structure causes the inner opening portion to be lifted along with the outer opening portion so as to create an opening through the flexible packaging structure and a marginal region of the outer opening portion is defined between the inner and outer lines of weakness, the marginal region overlying an underlying surface of the inner structure. The method may also involve scoring at least one line of weakness through both the outer structure and the inner structure to form a tab, wherein the at least one outer line of weakness terminates in at least one tear propagating element; scoring a second inner line of weakness in the inner structure, wherein the second inner line of weakness is disposed between the at least one tear propagating element of the tab and the at least one tear receiving element of the at least one outer line of weakness; and forming the scored laminate into a packaging structure having a first sidewall comprising the tab and a second sidewall, wherein the tab is disposed within an end seal region of the first sidewall; and end sealing the first sidewall to the second sidewall such that the tab remains unadhered to the second sidewall.

In yet another embodiment, the invention comprises a flexible packaging structure comprising a first sidewall and a second sidewall enclosing a product, wherein each of the first sidewall and the second sidewall comprises an outer structure; an inner structure; a pressure sensitive adhesive layer adhesively joining the outer structure and the inner structure to form a laminate, wherein the first sidewall has an opening end and a base end and a longitudinal direction which runs between the opening end and the base end; at least one outer line of weakness formed in the outer structure of the first sidewall, the at least one outer line of weakness defining part of an outer opening portion that is separable from the outer structure along the at least one outer line of weakness, wherein the at least one outer line of weakness terminates in at least one j-hook adjacent the opening end of the laminate; a first inner line of weakness formed in the inner structure of the first sidewall, the first inner line of weakness defining an inner opening portion that is separable from the inner structure along the first inner line of weakness, wherein: the inner opening portion is joined to the outer opening portion such that lifting the outer opening portion out of the plane of the flexible packaging structure causes the inner opening portion to be lifted along with the outer opening portion so as to create an opening through the flexible packaging structure; and a marginal region of the outer opening portion is defined between the inner and outer lines of weakness, the marginal region overlying an underlying surface of the inner structure; a tab defined by at least one line of weakness formed through both the outer structure and the inner structure of the first sidewall, wherein the at least one outer line of weakness terminates in at least one j-hook; and a second inner line of weakness formed in the inner structure of the first sidewall, wherein the second inner line of weakness is disposed between the at least one j-hook of the tab and the at least one j-hook of the at least one outer line of weakness.

BRIEF DESCRIPTION OF THE SEVERAL VIEWS OF THE DRAWINGS

Figure 1B:
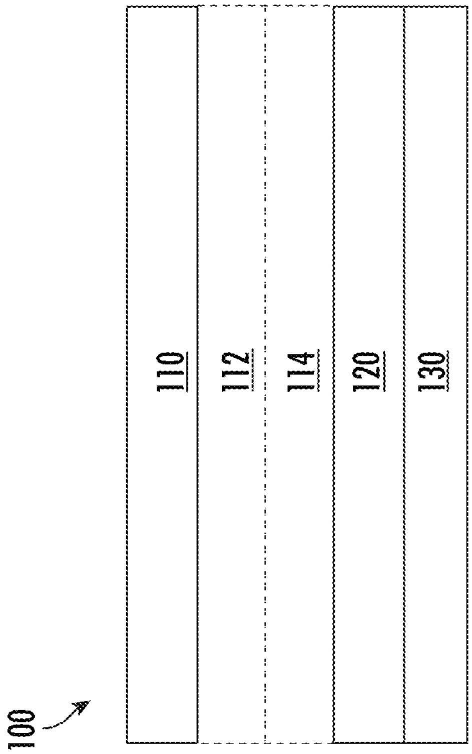
Figure 1A:
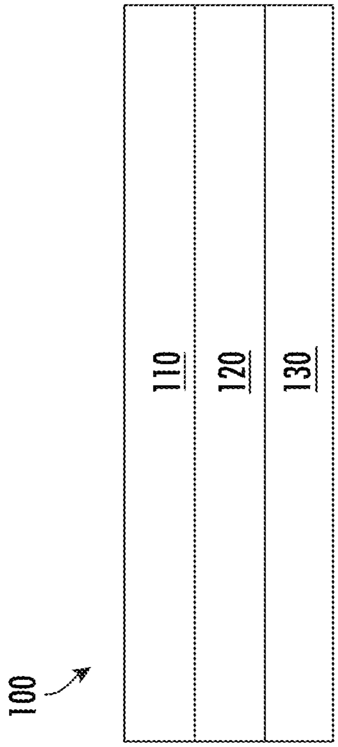
Figure 2A:
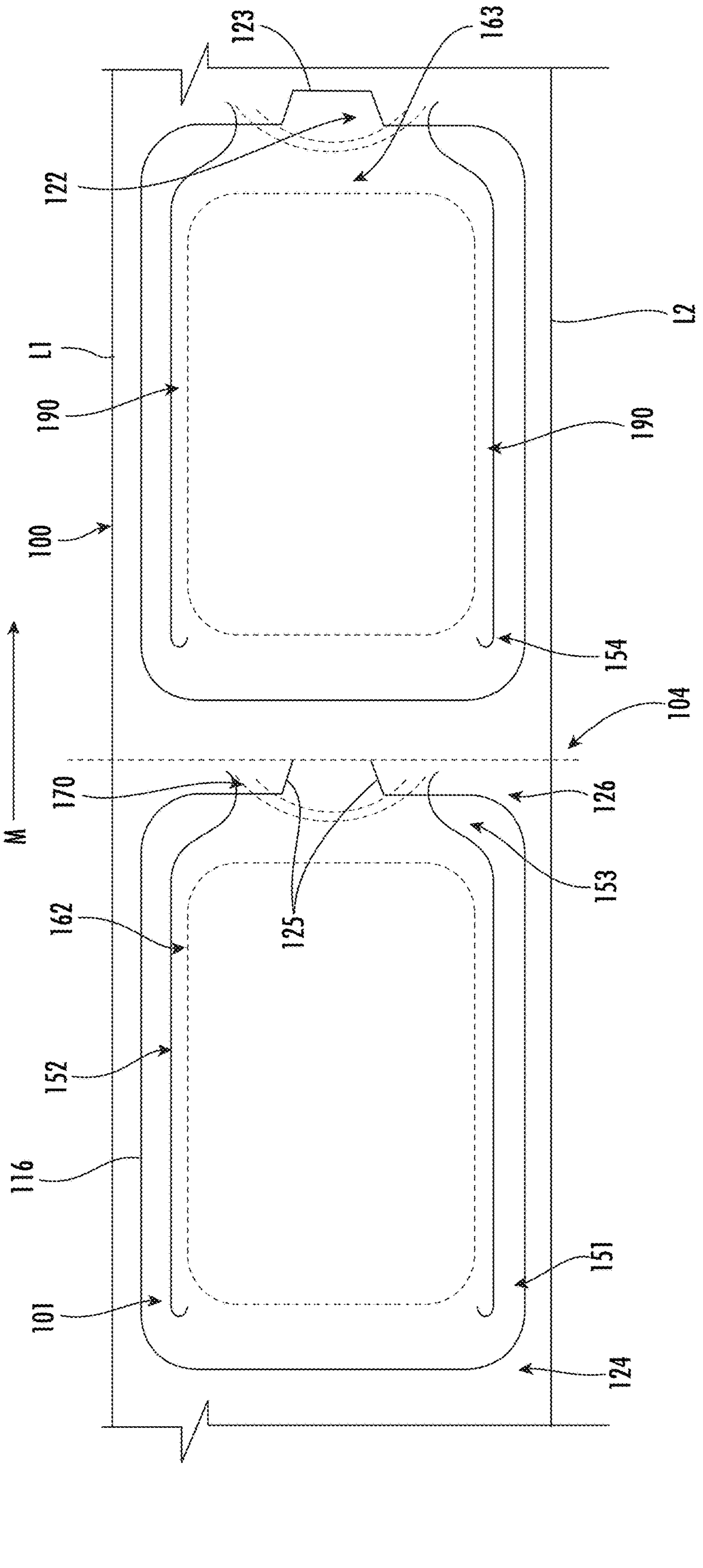
Figure 2B:
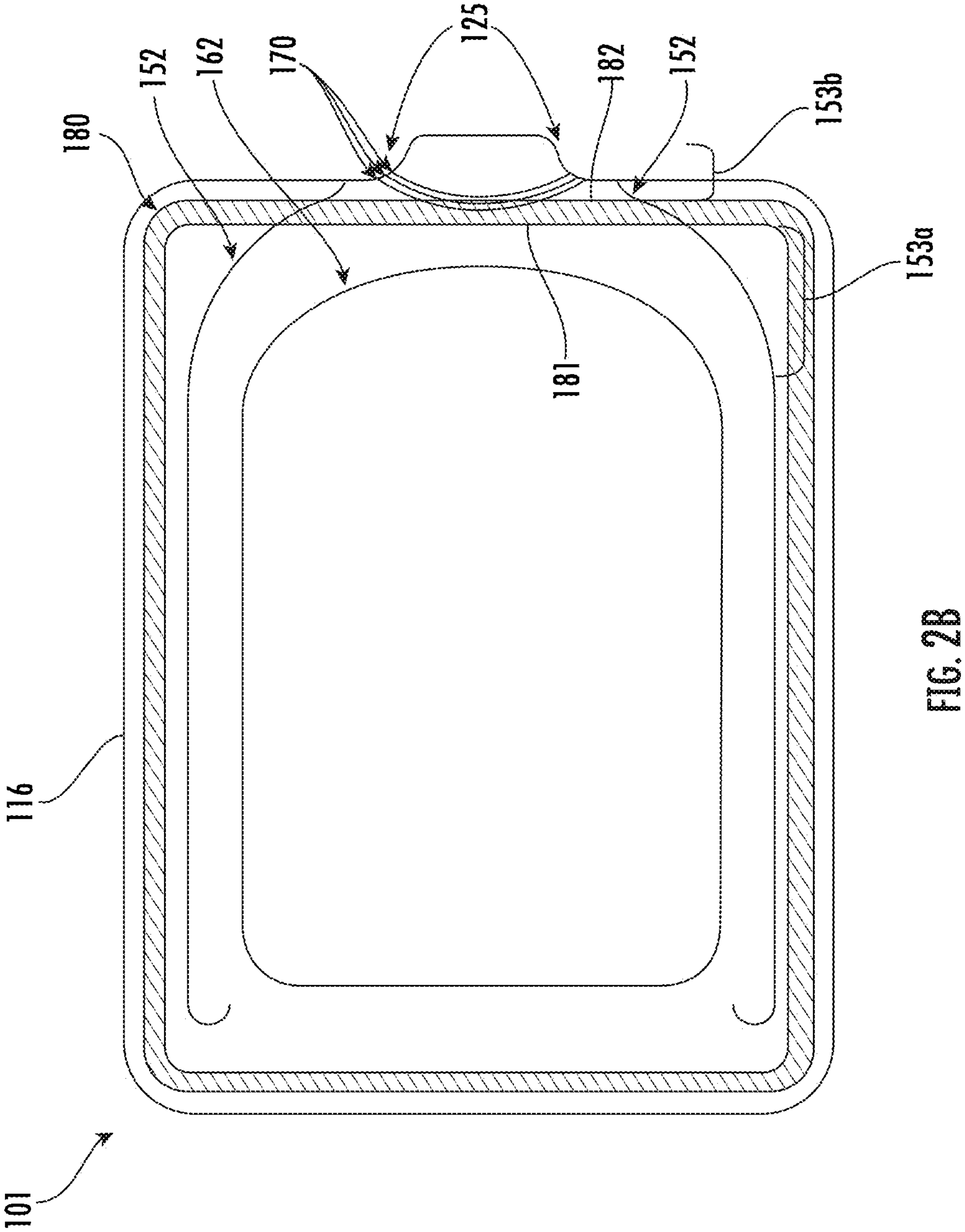
Figure 3A:
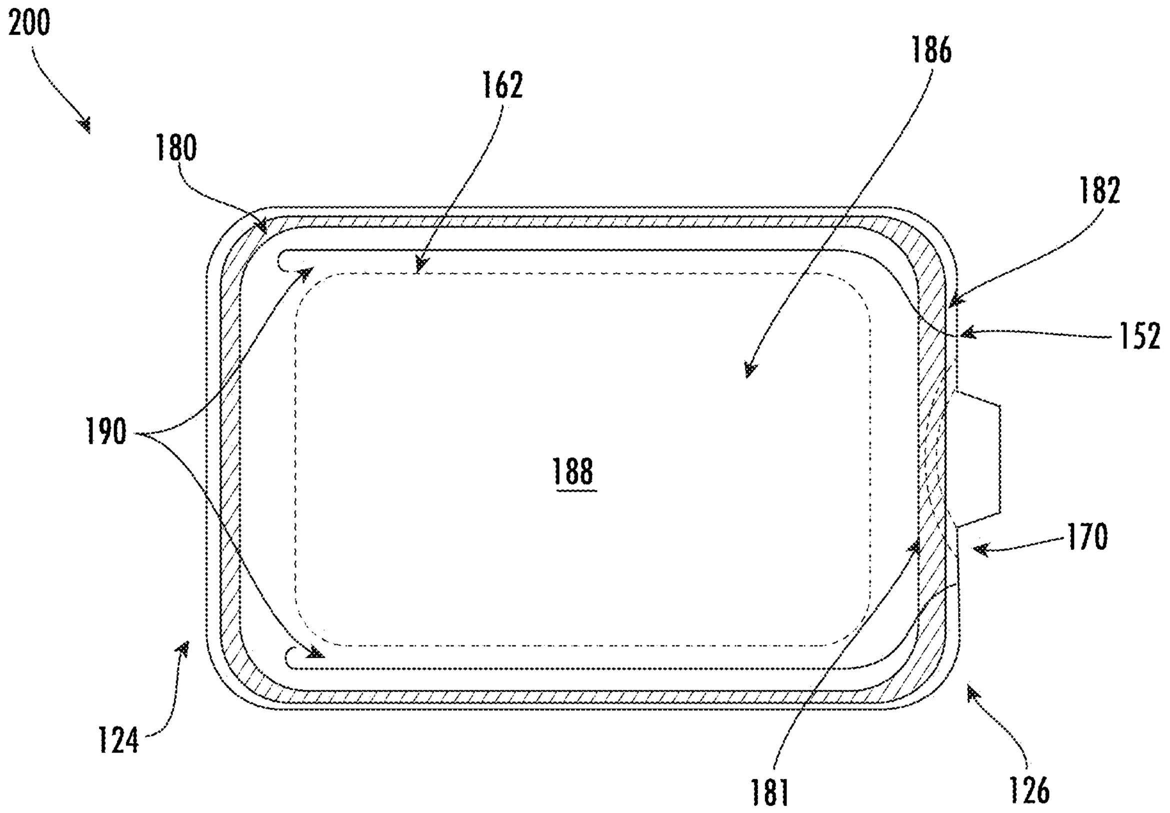
Figure 3B:
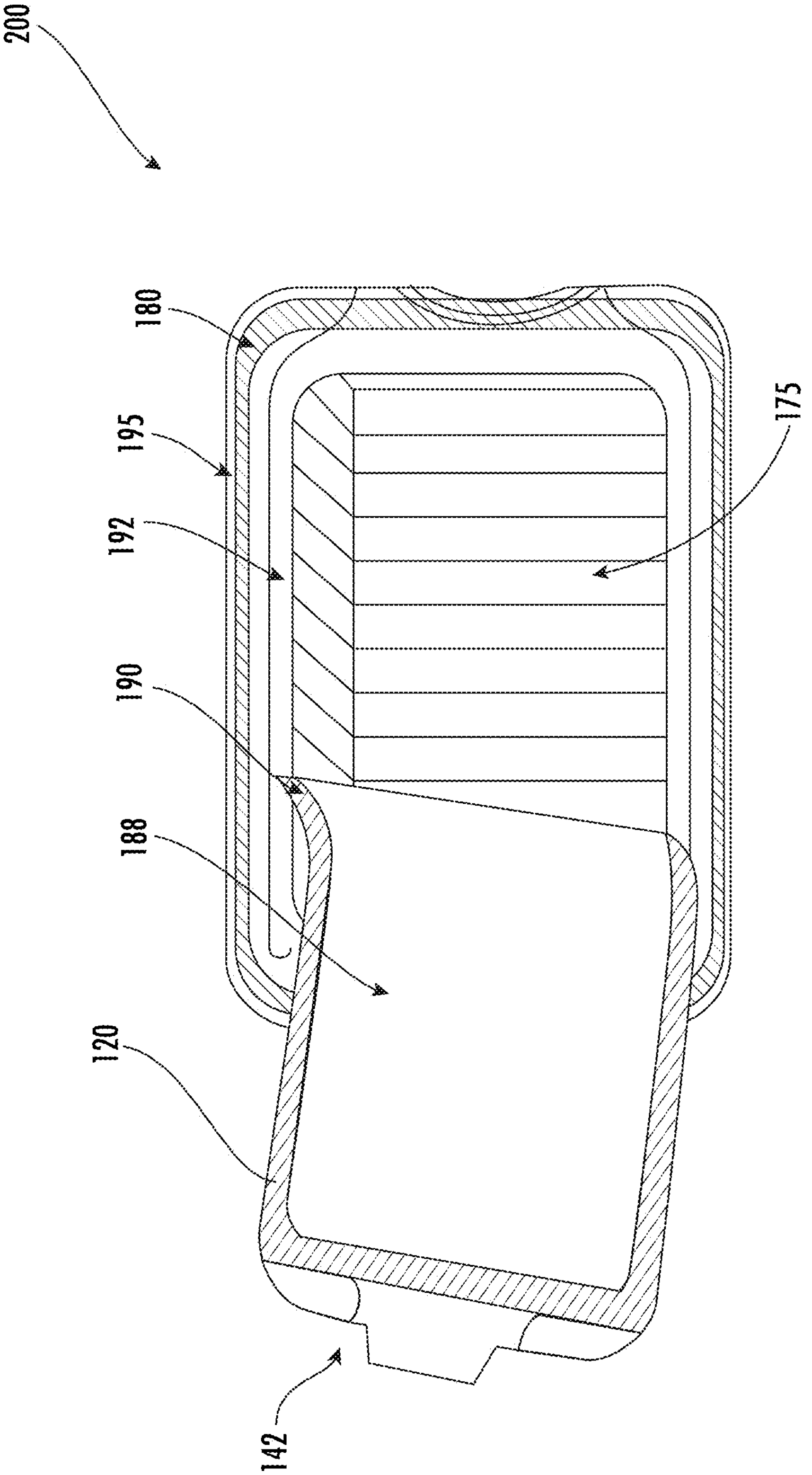
Figure 4:
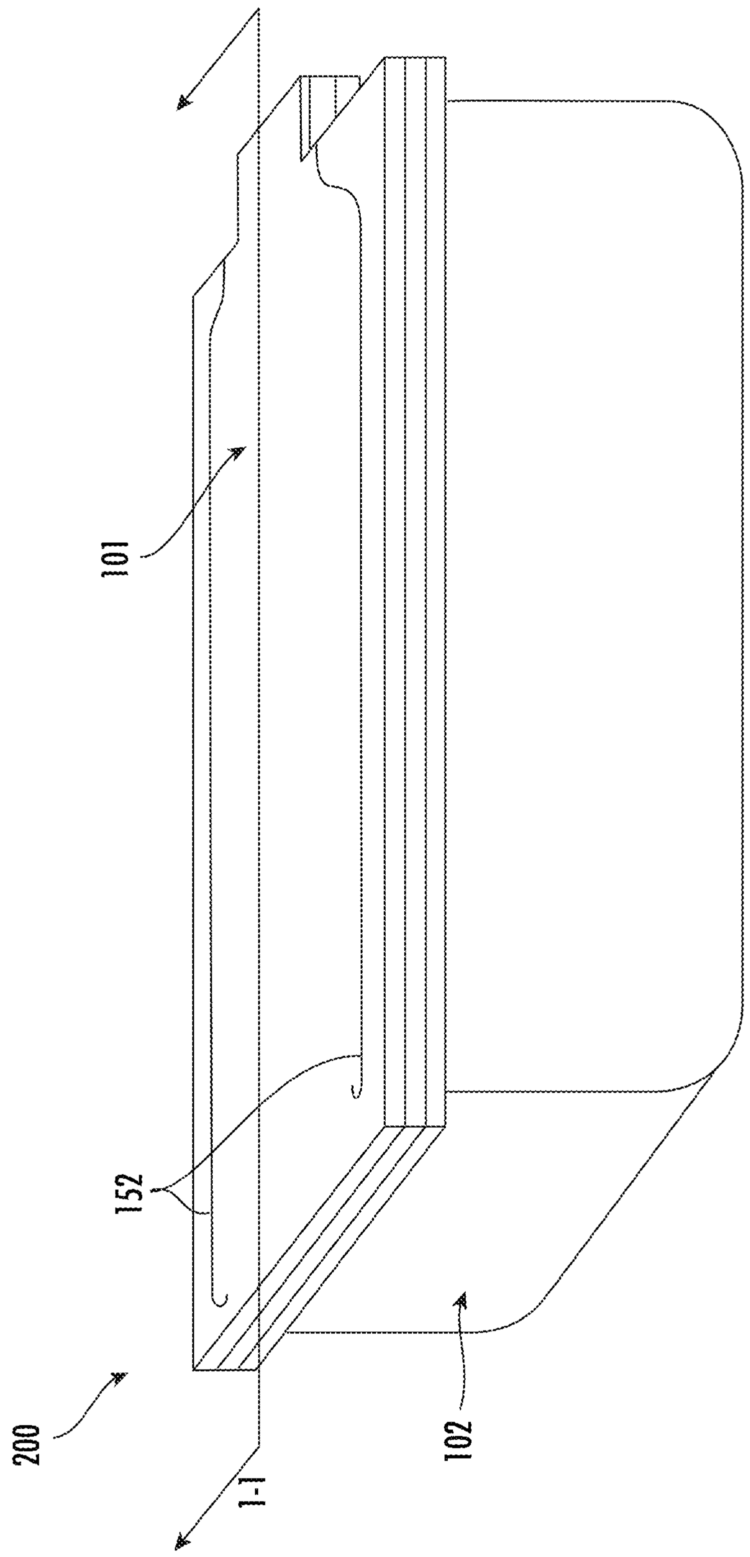
Figure 5A:
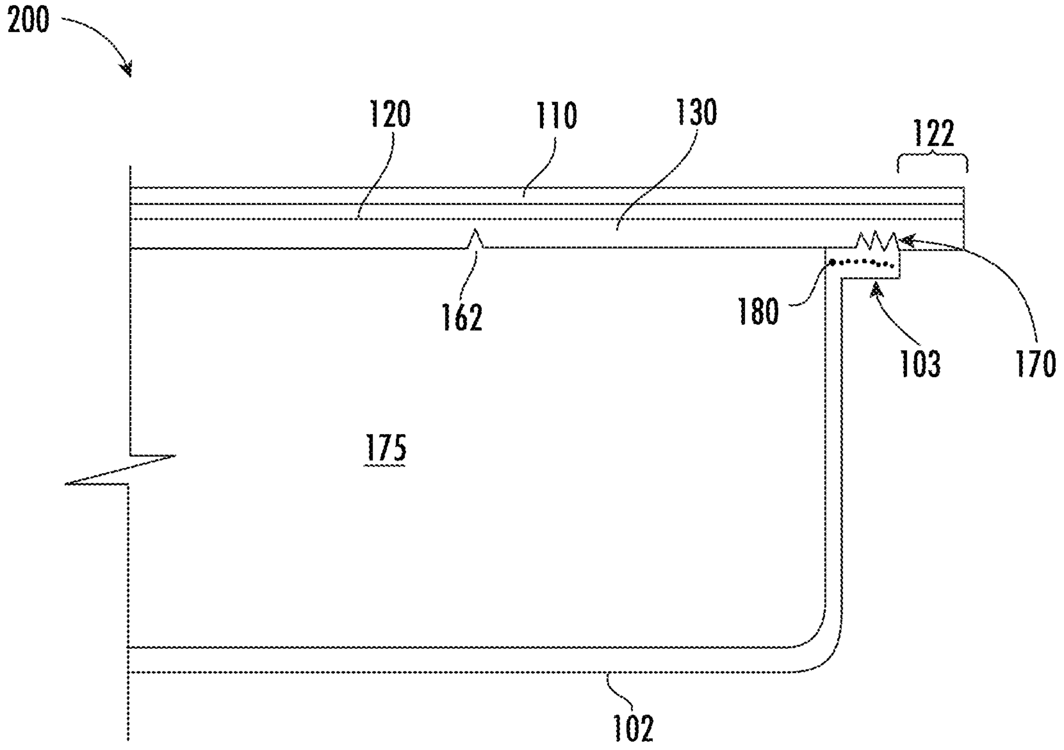
Figure 5B:
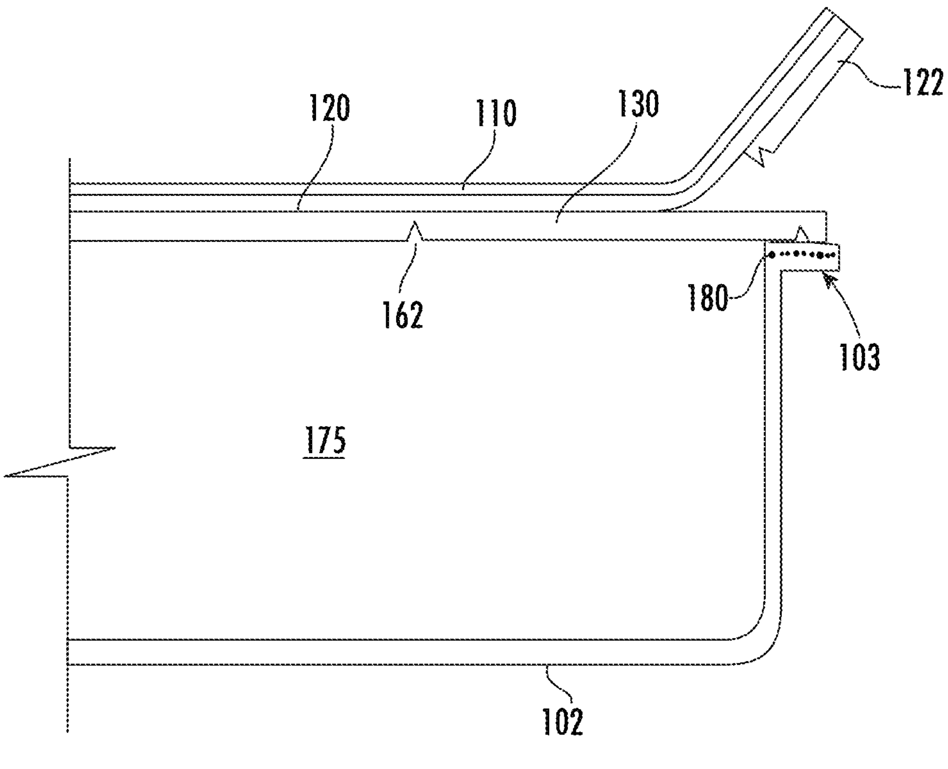
Figure 5C:
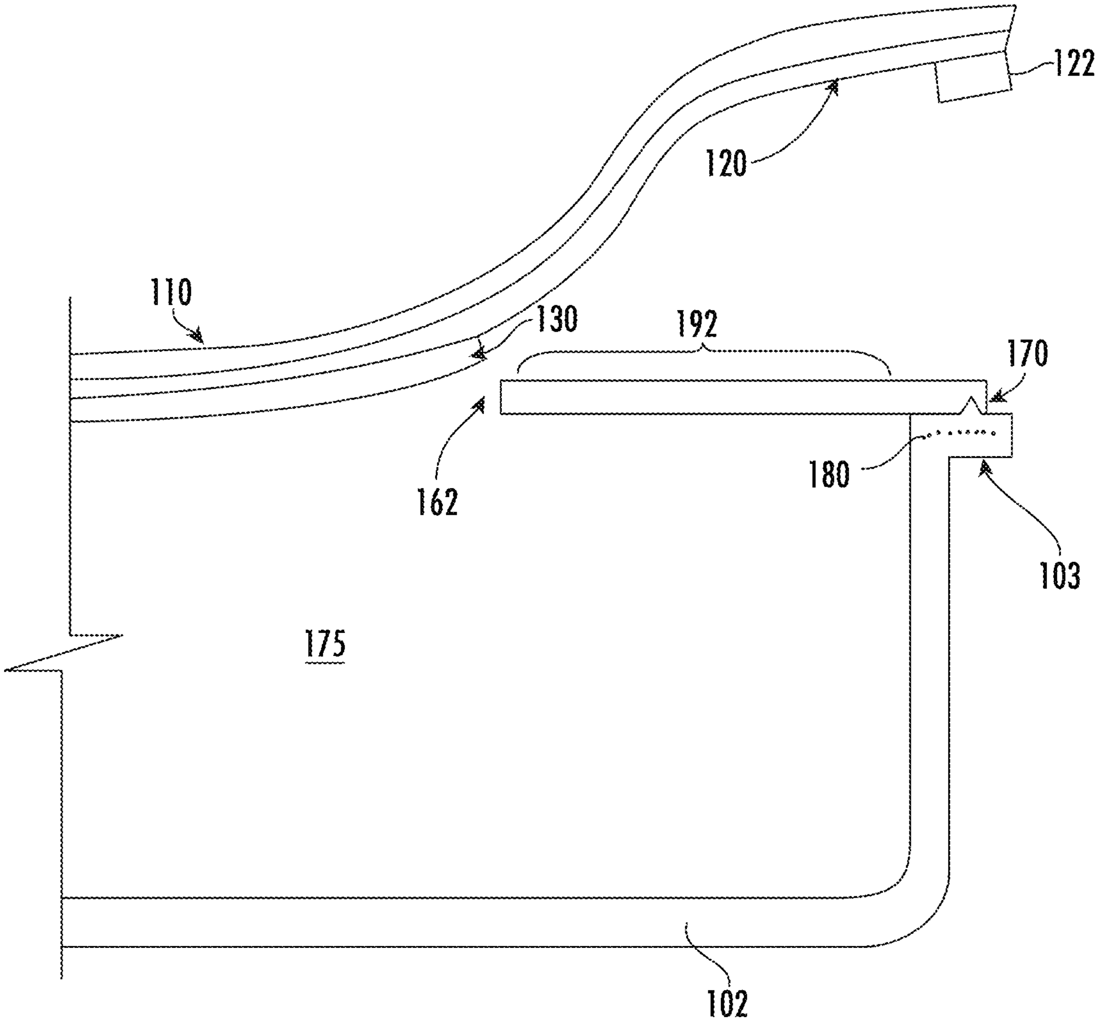
Figure 6A:
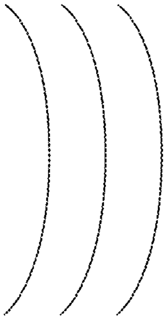
Figure 6B:
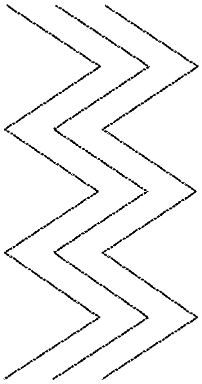
Figure 6C:
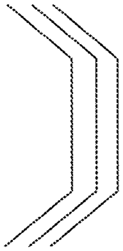
Figure 6D:
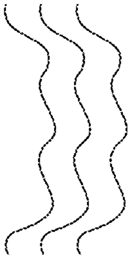
Figure 6E:
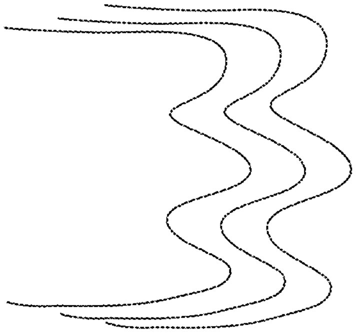
Figure 6F:
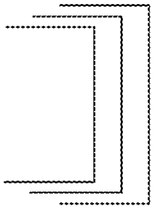
Figure 7A:
Figure 7B:
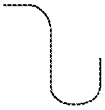
Figure 7C:
Figure 7D:
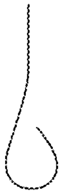
Figure 7E:
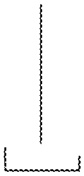
Figure 7F:
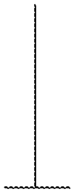
Figure 7G:
Figure 7H:
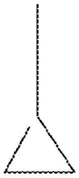
Figure 7I:
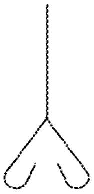
Figure 7J:
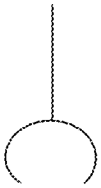
Figure 7K:
Figure 7L:
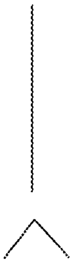

Having thus described the disclosure in general terms, reference will now be made to the accompanying drawings, which are not necessarily drawn to scale, and wherein:

FIG. 1A is a cross-sectional view of the laminate film structure, in an embodiment of the invention;

FIG. 1B is a cross-sectional view of the laminate film structure, in an embodiment of the invention;

FIG. 2A illustrates a top view of an example laminate roll, in an embodiment of the invention;

FIG. 2B illustrates a top view of an example lidding member cut from the example laminate roll, in an embodiment of the invention;

FIG. 3A is a top view of an example package, in an embodiment of the invention;

FIG. 3B is perspective view of the package shown in FIG. 1A, in an open configuration, in an embodiment of the invention;

FIG. 4 is a perspective view of a package having a laminate lidding, in an embodiment of the invention;

FIGS. 5A-C are cross-sectional views of the package shown in FIG. 4, in an embodiment of the invention, though line 1-1 in FIG. 4;

FIGS. 6A-F are perspective views of a die cut pattern, in an embodiment of the invention; and FIGS. 7A-7L are perspective views of termination die cut patterns, in an embodiment of the invention.

DETAILED DESCRIPTION

The present invention now will be described more fully hereinafter with reference to the accompanying drawings, in which some but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

In an embodiment of the invention, a flexible packaging laminate is constructed to have an integral opening and reclose function and a pull tab. The laminate is constructed as a multi-layer structure by adhesively laminating an outer structure to an inner structure, wherein each of the outer and inner structures may comprise one or more layers of flexible material. An adhesive layer is applied to one of the structures before lamination. Once the laminate is formed in this manner, scoring operations are performed.

In an embodiment, one or more scoring operations are performed on each side of the laminate. In an embodiment, some scoring operations penetrate only through a part of the thickness of the laminate; in particular, a scoring operation performed on the side of the laminate adjacent the outer structure results in penetration through the outer structure, but without complete penetration through the inner structure, and preferably without any substantial penetration, and more preferably without any penetration, into the inner structure. Likewise, a scoring operation performed on the side of the laminate adjacent the inner structure results in penetration through the inner structure, but without complete penetration through the outer structure, and preferably without any substantial penetration, and more preferably without any penetration, into the outer structure. However, in some scoring operations set forth herein, the scoring comprises a complete penetration through both the outer and inner structure. The scoring operations may form the peelable/reclosable flap, the pull tab, and the perimeter cut, as further described below.

In some embodiments, the package is formed to have an integral opening and reclose feature by forming the laminate as a two-part structure, having an outer structure joined in face-to-face relation with an inner structure. Each of the outer and inner structures can comprise one or more layers of flexible packaging material such as polymer film, paper, metal foil, and the like. An outer line of weakness is formed in the outer structure to define an outer opening portion that can be lifted out of the plane of the outer structure. Similarly, a first inner line of weakness is formed in the inner structure to define an inner opening portion that can be lifted out of the plane of the inner structure. Additionally, one or more second inner lines of weakness may be formed in the inner structure between the pull tab and the inner opening portion. The second inner line(s) of weakness may be disposed at least partially within the seal area. The outer and inner opening portions are attached to each other such that the outer and inner opening portions can be lifted out of the plane as a unit, thereby creating an opening through the packaging structure defined by the first inner line of weakness.

The outer opening portion is larger in area than the inner opening portion and has a marginal region that extends beyond the inner opening portion. When the outer and inner opening portions are lifted out of the plane to create the opening, an underlying portion of the inner structure in registration with the marginal region of the outer opening portion is exposed adjacent the opening. A pressure sensitive adhesive may be disposed on the inner surface of the outer structure and/or the outer surface of the inner structure. In an embodiment, the pressure sensitive adhesive is flood coated (100% coverage) over the inner surface of the outer structure and/or the outer surface of the inner structure. In other embodiments, the pressure sensitive adhesive may be pattern applied. After initial lifting of the outer and inner opening portions, the opening through the structure can be reclosed by adhering the marginal region of the outer opening portion to the underlying portion of the inner structure via the pressure sensitive adhesive.

In an embodiment, the outer structure is adhesively joined to the inner structure to form a laminate. The adhesive can be applied using any suitable equipment and techniques known in the art. In a traditional packaging structure, adhesive is not applied or is deadened in certain regions, such as in the region of the pull tab. This form of adhesive application is more expensive, time consuming, and has the potential for registration errors. Advantageously, an adhesive-free region or deadened region between the inner and outer structure is not necessary in the present invention because the pull tab, in an embodiment, comprises both the inner and outer structure. In contrast to existing packaging structures wherein the pull tab comprises only the outer structure, the pull tab of the present invention is not comprised of just the outer structure, but comprises the outer structure, adhesive, and inner structure. The adhesive may be flood coated (100% coverage) between the outer structure and the inner structure, even in the location of the tab. Similarly, the outer structure and inner structure may be coextensive with each other in the present invention, including in the location of the tab, and may each be continuous webs drawn from respective supply rolls and laminated together to form a laminate that is a continuous web.

Once the laminate structure is formed, in an embodiment, the laminate may be scored to form one or more outer lines of weakness (also referred to herein as "score lines") through the thickness of the outer structure, one or more first and second inner score lines through the thickness of the inner structure, and one or more through cut score lines which extend through the outer structure and the inner structure. Advantageously, because the structure is flood coated with pressure sensitive adhesive, the score lines need not be registered with respect to the adhesive or, in an embodiment, any printed material.

In an embodiment, the outer score line delineates the outer opening portion of the outer structure that is separable from the remainder of the outer structure along the outer score line, and the first inner score line delineates the inner opening portion of the inner structure that is affixed to the outer opening portion by the adhesive and is separable from the remainder of the inner structure along the first inner score line. The outer line of weakness or score line preferably penetrates through the thickness of the outer structure but not through the inner structure. Similarly, the first and second inner score lines preferably penetrate through the thickness of the inner structure but not through the outer structure.

In an embodiment, one or more second inner score lines define an opening feature which will be described in more detail herein. In an embodiment, a through cut score line (i.e., perimeter cut line) penetrates through the thickness of the inner and outer structure and defines a lidding member having a pull tab. In an embodiment, the score lines are formed by laser scoring. However, other methods, such as mechanical scoring, die cutting, kiss cutting, or a combination thereof may be utilized.

The inner structure or outer structure may include a barrier layer providing a barrier against the passage of moisture and/or oxygen. In some applications such as the packaging of moisture-sensitive products (e.g., cookies or similar products that tend to be degraded when exposed to the environment), it is important to provide a moisture barrier. The barrier layer can comprise any of various polymer-based barrier materials including barrier polymer films such as ethylene vinyl alcohol copolymer (EVOH), polyamide, and the like; metallized polyolefin films such as polyethylene, polypropylene, oriented polypropylene, and the like; AlOx-coated polymer films; SiOx-coated polymer films; metal foil such as aluminum foil; and others. Although the term "barrier layer" is used in connection with metallized films to refer to the entire metallized film, it will be recognized that it is the layer of metal that provides the barrier function. Likewise, it is the AlOx or SiOx coating that provides the barrier function in the ceramic-coated films, but the entire film nevertheless is referred to herein as a "barrier layer".

The outer structure may comprise a layer of polyester such as polyethylene terephthalate, which has a desirable crisp feel and is readily printed. The polyester layer can be printed with inks to provide graphics and indicia. In certain embodiments, the polyester layer is transparent and is reverse printed on the surface that faces the inner structure. In an embodiment, the outer structure may comprise reverse-printed ink, primer, and acrylic layers.

In an embodiment, the inner structure may comprise polyethylene terephthalate, low density polyethylene terephthalate, oriented polypropylene, or any other material known in the art. In an embodiment, the inner structure is heat sealable. In an embodiment, the inner structure may be metalized or may include and aluminum oxide barrier.

Turning to the figures, in the method of manufacture of the laminate 100, a first structure 110 (optionally the outer structure with respect to the interior space of a thermoformed tub) may be advanced from a supply roll. One or both surfaces of the first structure 110 may be optionally treated by corona discharge or a flame treatment to render the surface(s) more receptive to inks and/or to render the surface(s) more readily bondable to the adhesive 120 (pressure sensitive or permanent) that is subsequently applied to the surface as described below. The first structure 110 may optionally be pre-printed or may be printed as a part of the presently described manufacturing process. Optionally ink 112 and primer 114 layers may be applied to the exterior surface of the first structure or to the interior surface (see FIG. 1B) via a reverse printing process. The first structure may comprise one or more layers of flexible packaging material, including polymers such polyesters, polyolefins (including homopolymers and copolymers), polyamides, and others, paper, and/or metal foil. In an embodiment, the first structure may comprise at least a layer of polyester such as polyethylene terephthalate.

In an embodiment, a second structure 130 may also be advanced from a supply roll. One or both surfaces of the second structure 130 may be optionally treated by corona discharge or a flame treatment, as set forth above, or may be printed, reverse-printed, or the like. The second structure may be coextensive with the first structure 110 (i.e., the width of the second structure may be substantially equal to the width of the first structure and the longitudinal edges of the second structure may substantially coincide with the longitudinal edges of the first structure $L_1$, $L_2$). As used herein, the longitudinal edges of the first structure, second structure, and/or laminate refer to the edges set forth in FIG. 2A which extend in the machine direction of the film, perpendicular to the edge of the film wherein the roll is initiated. In an embodiment, the second structure 130 comprises the inner film structure and the first structure 110 comprises the outer film structure, with respect to the resulting laminate. The second structure 130 may comprise one or more layers of flexible packaging material, including polymers such polyesters, polyolefins (including homopolymers and copolymers), polyamides, and others, paper, and/or metal foil.

In an embodiment, an adhesive layer 120 is applied to the first structure and/or the second structure. In an embodiment, the adhesive 120 is a pressure sensitive adhesive. In an embodiment, the pressure sensitive adhesive is flood coated (100% coverage) onto the surface of the relevant structure. In an embodiment, the pressure sensitive adhesive may cover substantially the entirety or the entirety of the first structure and/or second structure. The pressure sensitive adhesive can comprise various compositions. Pressure sensitive adhesives form viscoelastic bonds that are aggressively and permanently tacky, adhere without the need of more than a finger or hand pressure, and require no activation by water, solvent or heat. Pressure sensitive adhesives are often based on non-crosslinked rubber adhesives in a latex emulsion or solvent-borne form, or can comprise acrylic and methacrylate adhesives, styrene copolymers (SIS/SBS), and silicones. Acrylic adhesives are known for excellent environmental resistance and fast-setting time when compared with other resin systems. Acrylic pressure sensitive adhesives often use an acrylate system. Natural rubber, synthetic rubber or elastomer sealants and adhesives can be based on a variety of systems such as silicone, polyurethane, chloroprene, butyl, polybutadiene, isoprene, or neoprene. When the packaging laminate of the invention is to be used for food packaging, the pressure sensitive adhesive generally must be a food grade composition. Various pressure sensitive adhesives are approved by the U.S. Food and Drug Administration for use in direct food contact, as regulated by 21 CFR Part 175.300. A food-grade pressure sensitive adhesive for use in the present invention is Jonbond 743 available from Bostik Findley. The adhesive application can comprise any suitable device capable of applying the pressure sensitive adhesive to the structure and the pressure sensitive adhesive may comprise any pressure sensitive adhesive known in the art. After application of the pressure sensitive adhesive, the relevant structure may be advanced to a dryer such as an oven or the like, to dry or partially dry the pressure sensitive adhesive.

Optionally, a permanent laminating adhesive may be pattern applied to the first or second structure in one or more locations within the adhesive layer 120. The permanent adhesive can comprise various compositions. Suitable examples include two-component polyurethane adhesive systems, such as Tycel 7900/7283 available from Henkel.

The first and second structures may then be laminated together, such as via a pair of rolls forming a nip therebetween. The first and second structures may be passed through the nip and laminated to each other. In a typical process, the laminate 100 would then be advance to a reel-up where it is wound into a roll for subsequent processing in a second, offline scoring phase of the manufacturing process, and a third, off line application phase of the manufacturing process. In the present invention, however, the scoring steps of the invention may be performed in-line with the lamination steps. In the process of the invention, the manufacture of the laminate and the incorporation of the opening/reclose features in the laminate are conducted in an in-line fashion as part of the same overall process. The process of the invention thus is much more efficient and less costly.

Manufacturing equipment may be provided which can apply adhesive, laminate layers, and score the laminate within the same processing line. In an embodiment, the scoring equipment comprises a laser scoring device. The depth of the score line formed by a laser can be regulated by regulating the power output or beam intensity of the laser beam, the width or spot size of the laser beam, and the amount of time a given spot on the film surface is irradiated by the beam. These factors generally are selected based on the characteristics of the material being scored. Some materials are more readily scored by lasers than other materials, as known in the art. The depth of the score line formed by the laser can be regulated by regulating the power output or beam intensity of the laser beam, the width or spot size of the laser beam, and the amount of time a given spot on the film surface is irradiated by the beam. These factors generally are selected based on the characteristics of the material being scored. For example, a wavelength of 10.6 microns may be utilized to score a first structure and/or second structure which comprises polyethylene terephthalate.

In an embodiment, several score lines may be formed in the laminate as part of the scoring process. The several score lines may be formed simultaneously or may be formed sequentially, in any sequence known in the art. Thus, while the steps herein are referred to as first, second, etc., the process should not be so limited.

Referring to FIGS. 2A-C, in an embodiment, a perimeter cut line 116 may be formed through the thickness of the laminate 100 defining a lidding member 101. In an embodiment, the lidding member 101 may be substantially rectangular. The corners of the perimeter cut line may be curved.

In an embodiment, the perimeter cut line 116 comprises a tab 122 along one edge of the lidding member 101, thereby deviating from the rectangular shape. Importantly, the tab 122 may extend from an edge (i.e. a longitudinal edge, a latitudinal edge, an edge parallel or perpendicular to the machine direction) and not a corner of the lidding member 101. In an embodiment, the lidding member 101 may comprise a tab side 126 along the edge of the lidding member defining the tab 122, and a base side 124, opposite the tab side 126.

The tab 122 may be arched, triangular, semi-circular, semi-ovular, rectangular, trapezoidal or other appropriate shape which provides a graspable extension from the lidding member 101. In an embodiment, the lidding member 101 may be substantially symmetrical about an axis extending in the machine direction. In an embodiment, the lidding member 101 may be substantially symmetrical through the tab 122.

In an embodiment, the at least one outer line of weakness 152 may be formed as a continuous line of weakness extending from a first side of the pull tab, to a second side of the pull tab interior of the perimeter cut line 116. In some embodiments, the outer line of weakness 152 may be formed as two or more distinct lines of weakness, each beginning at or near the base side 124 of the lidding member 101 and extending along the longitudinal edge of the first structure $L_1$ to the tab side 126 of the lidding member 101. Each of the outer lines of weakness 152 may be substantially parallel to the perimeter cut line 116 between the base side 124 and the tab side 126, in an embodiment. Further, in an embodiment, each of the outer lines of weakness 152 may be configured to intersect (i.e., cross) the perimeter cut line 116 on the tab side 126 of the lidding member 101, on opposing sides of the tab 122.

In one embodiment, the at least one outer line of weakness 152 (i.e. outer or overcut score line) may be formed through the thickness of the outer structure 110 of the lidding member 101. Because the pressure sensitive adhesive 120 has been flood coated and not pattern-applied in this embodiment, the outer line of weakness 152 does not need to be formed in registration with (i.e., coincide with) any pattern of pressure sensitive adhesive 120. The outer line of weakness 152 extends substantially through the thickness of the outer structure 110, but preferably does not extend to any substantial extent into the inner structure 130. The outer line of weakness 152 may or may not extend into the pressure sensitive adhesive layer 120.

Generally speaking, the outer line of weakness 152 may comprise a substantial portion of the perimeter of the outer opening portion 186 of the flap 142 (see FIG. 3A-3B) into a package. The outer line of weakness 152, in an embodiment, is discontinuous. In an embodiment, the outer line of weakness 152 comprises two separate score lines. In an embodiment, the outer line(s) of weakness 152 extend at least partially longitudinally along the lidding member 101, parallel to the longitudinal edges $L_1$, $L_2$ of the laminate. In an embodiment, the outer line(s) of weakness 152 extend at least partially in the machine direction M of the laminate. In an embodiment, the outer line(s) of weakness 152 extend inward of and at least partially along the longitudinal edges $L_1$, $L_2$ of the laminate 100.

In an embodiment, the outer line(s) of weakness 152 may have a base end 151 near the base side 124, opposite the pull tab 122 and a leading end 153 extending beyond the perimeter cut line 116 on either side of the pull tab 122. In an embodiment, the outer lines of weakness 152 may connect at their base end 151. In this embodiment, the outer opening portion 186 of the flap 142 may comprise a removable flap portion. In other embodiments, however, the outer line(s) of weakness 152 may not connect at their base end 151. Rather, the outer line(s) of weakness 152 may terminate in j-hooks 154 on their base end 151, preventing the flap 142 from being pulled beyond the position of the j-hooks 154. In an embodiment, the "hook" of the j-hooks 154 on the base end 151 of the outer line of weakness 152 is directed longitudinally, in the machine direction M of the laminate film web, or parallel to the longitudinal edges $L_1$, $L_2$ of the lidding member 101.

In an embodiment, the leading end 153 of the outer line(s) of weakness 152 is configured to intersect the perimeter cut line 116. The outer line(s) of weakness 152 may extend from the base side 124 of the lidding member 101, beyond the perimeter cut line 116 of the tab side 126, into the laminate 100. The extension into the laminate 100 ensures that the outer line(s) of weakness 152 extend past the seal area 180 when applied to a base member 102. The outer line(s) of weakness define a portion of the perimeter of the outer opening portion 186. In some embodiments, the outer line(s) of weakness 152 direct the opening of the flap 142 through the seal area 180.

In an embodiment, the lidding member 101 comprises uncut film material between the two leading ends 153 of the outer lines of weakness 152. In an embodiment, the width of the uncut film material between the two ends of the outer line of weakness 152 is approximately the width of the tab 122. In an embodiment, the width of the uncut film material between the two ends of the score lines 152 is greater than the width of the tab 122.

In some embodiments, the leading end 153 the outer line(s) of weakness 152 may have a shoulder region 153*a* and a neck region 153*b* (see FIG. 2B). The neck region 153*b* may begin at the perimeter cut line 116 and extend through the seal area 180. The shoulder region 153*a* may connect to the neck region 153*b* and extend from the seal area 180 through the marginal region 190 and toward the base of the lidding member. In some embodiments, the outer line(s) of weakness 152 may extend linearly from the base end 151 towards the leading end 153. In an embodiment, each outer line of weakness 152 may curve inwardly (i.e. concave) within the shoulder region 153*a*, and in some embodiments, the outer line(s) of weakness may curve outwardly (i.e. convex) within the neck region 153*b*. In an embodiment, the curvature in the neck region 153*b* is disposed where the outer line of weakness 152 intersects the perimeter cut line 116. The leading end 153 may change concavity at a transition point between the shoulder region 153*a* and the neck region 153*b*. In some embodiments, the transition point is on the inner perimeter 181 of the seal area, the outer perimeter 182 of the seal area, or within the seal area 180. In an embodiment, the lidding member 101 comprises two outer lines of weakness 152 that are symmetrical and mirror images of one another.

A first inner line of weakness 162 (i.e. inner or undercut score line) may be formed through the thickness of the inner structure 130. Again, because the pressure sensitive adhesive 120 has not been pattern-applied, the first inner line of weakness 162 need not be in registration with the pressure sensitive adhesive 120. The first inner line of weakness 162 extends substantially through the thickness of the inner structure 130, but preferably does not extend to any substantial extent into the outer structure 110. The first inner line of weakness 162 may or may not extend into the pressure sensitive adhesive layer 120. The first inner line of weakness 162 is spaced inwardly of the outer line of weakness 152 so as to define an inner opening portion 188 of smaller area than the outer opening portion 186. As further described below, the inner opening portion 188 is adhered to the outer opening portion 186 such that both portions 186, 188 are lifted together when opening the package 200.

In an embodiment, the first inner line of weakness 162, may be continuous (i.e. a closed shape such as an oval, square, rectangle, ellipse, circle, or other shape). In this embodiment, the inner opening portion 188 may fully separate from the remainder of the inner structure 130. In this embodiment, the first inner line of weakness 162 may connect at its base side and tab side (described below).

In an embodiment, the first inner line of weakness 162 generally mirrors the configuration of the outer line of weakness 152. In an embodiment, the first inner line of weakness 162 extends at least partially parallel to longitudinal edge L1, L2 along the laminate 100. In an embodiment, the first inner line of weakness 162 extends at least partially in the machine direction M of the laminate 100.

In an embodiment, the first inner line of weakness 162 may have a base end 161 opposite the pull tab 122 and a leading end 163 nearest the pull tab. In an embodiment, the first inner line of weakness 162 extends at least partially in a direction which is perpendicular to the longitudinal edges L1, L2 of the laminate on its leading end 163. Contrary to the outer line of weakness 152, the first inner line of weakness 162 may be continuous on its leading end 163. In an embodiment, the leading end 163 of the first inner line of weakness 162 may be configured angularly or in a curved manner. In a particular embodiment, the leading edge 163 of the first inner line of weakness 162 may be ovular or elliptical. In an embodiment, the first inner line of weakness 162 may be generally U-shaped or C-shaped, with the open end of the "U" or "C" directed toward the base side 124 of the lidding member 101.

In an embodiment, the first inner line of weakness 162 may be discontinuous and may not connect along the base side 124. Rather, first inner line of weakness 162 may terminate in j-hooks on the base side 124, preventing the flap 142 from being pulled beyond the position of the j-hooks. In this embodiment, the inner opening portion 188 of the flap defined by the first inner line of weakness 162 may have a generally U-shaped perimeter having three sides defined by the first inner line of weakness 162, and may be attached to the remainder of the inner film 130 along a fourth side (i.e., an imaginary line extending between the free ends of the two legs of the U-shaped inner line of weakness 162 along the base side 124). As noted, the first inner line of weakness 162 may be generally parallel to the outer line(s) of weakness 152 but may be spaced inwardly so as to define an inner opening portion 188 of smaller area than the outer opening portion 186. In an embodiment, the j-hooks, on the base side 124, of the first inner line of weakness 162 may be closer to the tab 122 than the j-hooks 154 terminating the base end 151 of the outer line of weakness 152. In an embodiment, the inner line of weakness j-hooks and/or the outer line of weakness j-hooks 154 may be directed inwardly (toward the center of the flap 142) or outwardly.

In an embodiment, there is a marginal region 190 of the outer opening portion 186 that extends beyond the edge of the inner opening portion 188. The pressure sensitive adhesive 120 is between this marginal region 190 and an underlying surface 192 of the inner structure 130. The outer opening portion 186 and inner opening portion 188 are also joined by the pressure sensitive adhesive layer 120.

In an embodiment, as discussed above, the scoring process set forth herein forms a pull tab 122 defined within the perimeter cut line 116. Typically, a pull tab in a packaging structure such as the one described herein is constructed such that the tab is formed in only the outer layer of a laminate structure. In some embodiments, the tab is positioned within the perimeter of the packaging structure, such as between end seals. The pull tab would often be free from adhesive or lamination to the inner layer or deadened with respect to any adhesive positioned therein. In the present invention, however, the pull tab 122 comprises both the outer 110 and inner 130 film layers and the pressure sensitive adhesive layer 120 therebetween. In the present invention, the perimeter cut line 116 may be scored such that the tab 122 is symmetrical about a center axis between the longitudinal edges $L_1$, $L_2$ of the laminate. In another embodiment, the pull tab 122 may be centered along one of the longitudinal edges $L_1$, $L_2$ of the lidding member 101. However, the pull tab 122 may be disposed in any position and should not be so limited.

The pull tab 122 may be defined by the perimeter cut line 116. In some embodiments, the pull tab 122 may have three edges, two side edges 125 extending from the lidding member 101 outwardly, and a third distal edge 123, substantially parallel to the tab side 126 of the lidding member, wherein the distal edge connects the two side edges 125. In one embodiment, the two side edges 125 may be parallel or substantially parallel to one another, and in another embodiment the two side edges 125 may extend towards one another at an angle. The pull tab side edges 125 may be parallel or substantially parallel to the longitudinal edges $L_1$, $L_2$ of the laminate 101. In other embodiments, the side edges 125 may be curved, angled, or irregular. The side edges 125 may be designed in a shape and configuration to draw attention to the tab 122 in particular embodiments.

The outer line(s) of weakness 152 is configured to intersect, connect to, or cross the perimeter cut line 116. In the laminate matrix, the outer line(s) of weakness 152 may extend from the base side 124 of the lidding member 101, past the tab side 126, over the perimeter cut line 116, and into the laminate 100 beyond the perimeter cut line 116. The extension into the laminate 100 ensures that the outer line(s) of weakness 152 extend past the seal area 180 when applied to a base member 102. The outer line(s) of weakness define the outer opening portion 186. In some embodiments, the outer line(s) of weakness 152 direct the opening of the flap 142. In some embodiments, for the flap to properly open across the seal area 180 there must be at least one line of weakness in each of the outer structure 110 and the inner structure 130 within in the seal area 180. The second inner line of weakness 170 provides weakness in the inner structure 130 within the seal area 180, and the outer line of weakness 152 provides weakness in the outer structure 110 within the seal area 180. The plurality of lines of weakness allow a user to access the contents of the package 200 without using excessive force and without breaking the heat seal (or other form of permanent seal) within the seal area 180.

When the lidding member 101 is formed within the laminate roll the spacing of the lines of weakness define the shape of the opening regions. The lines of weakness must be formed such that when the lidding member is applied onto a base member, the flap 142 is openable such that the cavity 175 is accessible. The outer lines of weakness 152 along the longitudinal edges $L_1$, $L_2$ are spaced inward from the perimeter cut line 116 leaving a peripheral region 195 extending respectively therebetween. The peripheral region 195 may provide a space between the edge of the lidding member 101 and the outer lines of weakness 152 which comprises a seal area 180, wherein the seal area 180 can be permanently sealed to a base member. The underlying structure 192 corresponds to the marginal region 190 of the flap 142. The adhesion or cohesion and resealability of the marginal region 190 and the underlying structure 192 provide a seal about the cavity such that the contents of the package 200 are preserved. The linearity of the seal ensures the marginal region stays flat (i.e., no creases or crinkles) such that there is a complete seal upon reapplication of the marginal region 190 to the underlying structure 192 maintaining freshness of the contents of the package.

Presenting the tab 122 integral with the perimeter cut line 116 provides many advantages. Because the tab 122 is aligned with the edge of the package, it can be identified, accessed, and lifted away from the package with ease, reducing customer frustrations. In addition, the laminate and packaging structures discussed herein have a lower cost of manufacture because the cutting/scoring process is less complicated and less waste is created in the manufacturing process. For example, the waste created between the edge of the tab and the laminate boundaries may be reduced or eliminated, as noted below.

In an embodiment, the distance between tab edges 125 may be between about ½ inch and about 1 inch. In another embodiment, the distance between tab edges 125 may be about ⅝ inch.

In an embodiment, the tab distal edge 123 initiates at the edge of the lidding member 101. In this embodiment, when the laminate web is cut into individual packaging structures, the lidding member separation cut line 104 will comprise the edge of the lidding member 101 at the tab distal edge 123 (perpendicular to the longitudinal edges $L_1$, $L_2$ of the laminate). In other embodiments, the base side 124 of the perimeter cut line 116 may disposed at the lidding member separation cut line 104. In any case, when the laminate is slit into packaging structures, the lidding member separation cut line 104 may comprise either the tab distal edge 123, the base end 124, or in some embodiments both the tab distal edge 123 and the base end 124. Alternatively, a separate cut line could be formed which comprises neither the tab distal edge 123 or the base side 124 edge.

It should be noted that while the disclosure herein refers to certain elements (i.e., 154) as j-hooks, any form of tear propagation restriction, management or direction may be used, such as Sheppard hoods, smile hooks, T-hooks, double j-hooks, dovetail, or score lines which have no common nomenclature in the art (see FIGS. 7A-7L). Likewise, the tear propagation restriction, management or directional elements may be inwardly oriented, outwardly oriented, angularly oriented, horizontally oriented, vertically oriented, or may be disposed in any other orientation known in the art.

One or more second inner lines of weakness 170 may be disposed through the inner structure 130 without being disposed through (substantially or fully) or within the outer structure 110. The additional score line 170 may comprise one undercut or a plurality of undercuts in an embodiment. In an embodiment, the second inner lines of weakness 170 are disposed between the outer line(s) of weakness 152, near the tab side 126 region of the lidding member 101, such that the outer line(s) of weakness 152 and the inner line of weakness 170 do not intersect (i.e., cross or overlap) within the perimeter of the lidding member 101. In an embodiment, the central portion of second inner lines of weakness 170 are generally disposed between first inner line of weakness 162 (defining inner opening portion 188) and tab 122.

In an embodiment, the second inner lines of weakness 170 comprise curved lines, concave toward the tab 122. The inner lines of weakness 170 may comprise a "smile" with their upward curved ends closer to the tab 122. In an embodiment, the line of weakness 170 is generally perpendicular to the longitudinal edges $L_1$, $L_2$ of the laminate through its central portion but gradually curves toward the tab 122 near its opposite ends. In an embodiment, the line of weakness 170 has a consistent radius of curvature throughout its length.

In other embodiments, the lines of weakness 170 may be angled (i.e., a chevron or arrow) or have various radii of curvature throughout its length. In an embodiment, the line of weakness 170 may take any form which allows the tab 122 to separate from the inner structure 130 and directs the separation to the adjacent outer line(s) of weakness 152 and then towards the base end 151 of the outer line of weakness 152 (see examples in FIGS. 6A-6E). In an embodiment, each opposite end of the second inner line of weakness 170 extends toward its respective longitudinal edge $L_1$, $L_2$ of the laminate.

In an embodiment, the second inner line of weakness 170 may be a plurality of lines of weakness. The lines of weakness 170 may be identical (i.e., mirror images) and spaced apart along the longitudinal axis (e.g., FIG. 6A-6D). In some embodiments, the lines of weakness 170 may have the same shape or pattern but have different sizes so each of the lines of weakness 170 do not intersect or overlap with one another (e.g., FIG. 6E-6F). In an embodiment, the second inner lines of weakness 170 may be concentric.

In some embodiments, the second inner lines of weakness 170 may be configured to extend laterally or longitudinally into, but not beyond seal area 180. The seal area 180 may be an area of the lidding member 101 configured to be permanently sealed to a tray, package, tub, or other container. In some embodiments, the permanent seal may be formed as a heat seal, an application of a permanent adhesive, or any other method known in the art. The second inner lines of weakness 170 may provide a break in the inner structure 130, in the location of the seal area 180, such that when the tab is pulled the second inner lines of weakness 170 allow the tab 122 to be lifted away from the remainder of the inner structure 130. In an embodiment, the second inner line of weakness 170 may be formed within the tab 122. In some embodiments all of the inner lines of weakness 170 may extend across the perimeter cut line 116, while in some embodiments not all of the inner lines of weakness 170 extend beyond the perimeter cut line 116. In some embodiments all of the inner lines of weakness 170 may extend into the seal area 180, while in some embodiments not all of the inner lines of weakness 170 extend into the seal area 180. In an embodiment, at least one inner line of weakness 170 extends into the seal area 180. In an embodiment, a plurality of inner lines of weakness 170 are scored to ensure that at least one inner line of weakness 170 extends into the seal area 180, regardless of registration of the scoring with the seal area 180. Because the inner line of weakness 170 does not extend beyond the inner perimeter 181 of the seal area 180, they do not affect the hermeticity of the packaging.

FIG. 3A illustrates a top view example of a package 200 having a lidding member 101 sealed to a base member 102. The lidding member 101 is configured to be peeled away from the base member 102 to provide access to a cavity 175 in which the package contents are stored. The lidding member 101 may, for example, be secured to a flange 103 of a tub or other container in a seal area 180 extending about the flange 103. The seal area 180 may be an area where a permanent adhesive is applied to secure the lidding member 101 onto the flange, in some embodiments. In other embodiments, the seal area 180 may formed as a heat seal extending about the flange 103 (e.g., an outwardly extending flange of a tray or tub) of the base member 102. In some embodiments, the seal area 180 extends around the entire perimeter of the lidding member and container to which it is affixed.

At least one of the laminate structures may comprise components having thermoplastic properties to facilitate and improve the sealing properties of the seal area 180. In an embodiment a heat seal may be obtained by bringing the laminate lidding member 101 or containers 200 into contact with heat such that the thermoplastic components in the material melt and provides the heat seal. The heat seal may alternatively be obtained using any suitable method known in the art, for example, by hot air welding or conventional heat mold sealing.

In an embodiment, a specific heat seal tool is utilized to form a heat seal between the lidding member 101 about the flange 103 of the base member. In this embodiment, the entirety of the tab 122 may not be heat sealed.

The tool may be configured such that the heat seal encompasses/covers the second inner line of weakness 170 (i.e. inner line of weakness 170 extends partially through the seal area 180, but the inner line of weakness 170 does not extend into the underlying surface 192 extending from the seal area). This may help ensure the hermeticity of the packaging structure upon opening.

The seal area 180 may provide a permanent seal fixing the lidding member 101 to the base member 102. In some embodiments, providing an opening within the lidding member (e.g., the laminate layers separating) allows the container 200 to maintain a better hermetic seal. In some embodiments, applying a lidding member configured to open and reseal about the flange of a container, allows the laminate to deform and crinkle about the edges. Further the seal about the container is not maintained after the first opening as the laminate may deform, or stick to itself, and not reapply to the container fully. When such conventional packages are in a refrigerated environment, there may be stresses created at the interface between the base member 102 and the lidding member 101, such that there are channels created in the seal between the lidding member and the base member upon reseal. Thus, with the channels, air and moisture are able to penetrate the cavity 175 and accelerate the spoilage of the contents within the package. In an embodiment, the seal area 180 between the flange 103 and the lidding member 101 creates a perimeter about the container 200 that acts as a blockade or other barrier to such channels.

FIGS. 5A-5C illustrate cross-sectional views of an example package 200 (shown in FIG. 4 taken along line 1-1), having a lidding member 101 sealed to a base member 102. The base member may have a flange 103 extending about the perimeter of the base member 102. In some embodiments, the lidding member 101 may be sized such that the perimeter cut line 116 extends beyond the flange 103, while in other embodiments the perimeter cut line 116 of the lidding member may align with the outer perimeter of the flange 103.

In some embodiments, the seal area 180 extends about the flange 103. In some embodiments, the seal area 180 is over the entire flange, while in other embodiments, the seal area is within a portion of the flange 103. The second inner lines of weakness 170 are formed within the lidding member 101 in the tab side 126 region where the seal area 180 will be formed upon application to the base member 102. The second inner lines of weakness 170 are disposed so at least a portion of a line of weakness 170 will enter into the seal area 180.

At least a portion of the tab 122 extends beyond the flange 103. Thus, when the tab is lifted away from the base member 102 the laminate 100 partially fractures along the lines of weakness 170 such that the outer opening portion 186 of the flap 142 may lift away from seal area 180. The outer opening portion 186 may be bound by the outer line(s) of weakness 152, and the base side 124 of the lidding member 101.

In use, a consumer may grasp the tab 122 and pull away from the base member 102. Because the tab 122 is formed integral to the lidding member 101, and extends beyond the seal area 180, at least the edge of the tab 122 is easily grasped, and pulled.

Upon grasping and pulling the tab 122, the user must pull the tab 122 through the seal area 180 wherein the second inner line(s) of weakness 170 are disposed in the inner layer 130. As the tab 122 is peeled back to the seal area 180, the second inner lines of weakness 170 are met. At the second inner lines of weakness 170, the outer structure 110 and inner structure 130 of the laminate 100 separate at the adhesive layer 120 (FIG. 5B). In this embodiment, the lidding member 101 and the tub 103 maintain their heat seal within the seal area 180.

As the tab 122 is continued to be peeled back, the outer structure 110 and at least a portion of the adhesive layer 120 lift away from the inner structure 130. Once the outer opening portion 186 reaches the first inner line of weakness 162 the inner opening portion 188 begins to open (FIG. 5C).

In some embodiments, the outer opening portion 186 may detach from the remainder of the outer structure 110 along the outer line of weakness 152, and the inner opening portion 188 remains attached to the outer opening portion thereby creating an opening into the cavity. In another embodiment, the outer and inner opening portions form a flap 142 that remains attached along a hinge line defined between the free ends of the two base sides 154 of the outer lines of weakness 152.

The package is reclosable by re-attaching the adhesive layer 120 to the underlying surface 192 of the inner structure 130 to restore the package 200 to a closed condition. It will, however, be readily apparent that the package has already been opened, because the outer structure 110 will be torn along the outer line of weakness 152 No amount of care in replacing the flap 142 in its original position can cover the fact that the area between the tab 122 and the outer line of weakness 152 has been torn through.

In some embodiments, the outer structure 110 can be substantially non-transparent or opaque. The non-transparent or opaque character of the outer structure 110 can be a characteristic of the film material itself or can be achieved by a coating of ink or the like on the film.

In an embodiment, the outer structure 110 may have a greater affinity for bonding with the adhesive layer 120 than does the surface 192 of the inner structure 130, and hence the pressure sensitive adhesive 120 is detached from the surface 192 and remains attached to the marginal region 190 of the outer opening portion 186 as shown in FIGS. 5A-5C. The greater bonding affinity of the outer structure 110 can be achieved in various ways. For example, the surface of the outer structure 110 can be treated by corona discharge or flame treatment, to increase the surface energy and enhance the bonding affinity. It is also possible to control the bond strength of the pressure sensitive adhesive to the layer by including an additive in the adhesive to reduce the bond strength, if desired.

Although it is preferred to have the pressure sensitive adhesive be applied to the outer structure and to remain on the outer structure upon opening, it is also within the scope of the invention to apply the pressure sensitive adhesive to the inner structure and to remain on the inner structure upon opening.

The printing on the laminate can include text adjacent to the interrupted areas between the tab 122 and the outer line of weakness 152, calling the consumer's attention to the presence of the interrupted areas and indicating that if they are torn through, the consumer should not purchase the package.

It should be noted that the terms "line of weakness" and "score line" as used herein refer either to a complete cutting through the thickness of one or more layers of the laminate or to a partial cutting through of the thickness of such layer(s) allowing the layer(s) to be severed along the score line. The terms may include perforated cut lines or continuous cut lines.

The packages described above are formed by providing a base member, placing the contents within the base member, aligning the lidding member over the base member, and heat sealing the lidding member to the base member.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method of making a packaging structure, the method comprising:

providing a base member defining a cavity configured to receive an item therein, the base member comprising a flange;

providing a flexible film inner structure and a flexible film outer structure;

forming a laminate by adhering the outer structure to the inner structure;

scoring the outer structure to form at least one outer line of weakness defining an outer opening portion that is separable from the outer structure along the at least one outer line of weakness;

scoring the inner structure to form at least one first inner line of weakness defining an inner opening portion that is separable from the inner structure along the inner line of weakness;

scoring the inner structure to form at least one second inner line of weakness;

cutting a perimeter line through both the outer structure and the inner structure of the laminate to form a lidding member, wherein the perimeter line comprises a pull tab, wherein:

the perimeter line intersects the at least one outer line of weakness adjacent opposite sides of the pull tab; and the at least one second inner line of weakness is disposed between the pull tab and the inner opening portion; and permanently sealing the lidding member to the flange to form a seal area, wherein the at least one second inner line of weakness is disposed at least partially within the seal area.

2. The method of claim 1, wherein the inner opening portion is joined to the outer opening portion such that lifting the outer opening portion causes the inner opening portion to be lifted along with the outer opening portion so as to create an opening through the laminate.

3. The method of claim 1, wherein a marginal region of the outer opening portion is defined between the inner and outer lines of weakness, the marginal region overlying an underlying surface of the inner structure.

4. The method of claim 1, wherein the scoring comprises cutting through the entire respective structure or laminate.

5. The method of claim 1, wherein the scoring comprises partially cutting through the respective structure.

6. The method of claim 1, wherein the scoring comprises perforating the respective structure.

7. The method of claim 1, additionally comprising applying a heat seal material or coating to one surface of the inner structure.

8. The method of claim 1, wherein the permanently sealing step comprises heat sealing.

9. The method of claim 1, wherein scoring the at least one outer line of weakness comprises scoring a first outer line of weakness and a second outer line of weakness, wherein the second outer line of weakness is discontinuous from the first outer line of weakness.

10. The method of claim 9, wherein the first outer line of weakness extends from a base end of the package and intersects the perimeter cut line on a first side of the pull tab, and the second outer line of weakness extends from the base end of the package and intersects the perimeter cut line on a second side of the pull tab, wherein the first side and the second side of the pull tab are opposite.

11. The method of claim 9, wherein the first outer line of weakness and the second outer line of weakness each terminate in a j-hook on the base end.

12. The method of claim 1, comprising scoring the at least one outer line of weakness such that it intersects the seal area adjacent the perimeter line.

13. The method of claim 1, wherein a pressure sensitive adhesive is used to adhere the outer structure to the inner structure.

14. The method of claim 13, wherein the pull tab comprises the inner structure, the outer structure, and the pressure sensitive adhesive.

15. The method of claim 1, further comprising disposing an ink layer between the outer structure and the inner structure.

* * * * *